Jan. 8, 1963     H. E. DUSTIN     3,072,100
ANIMAL SORTER
Filed Nov. 7, 1961
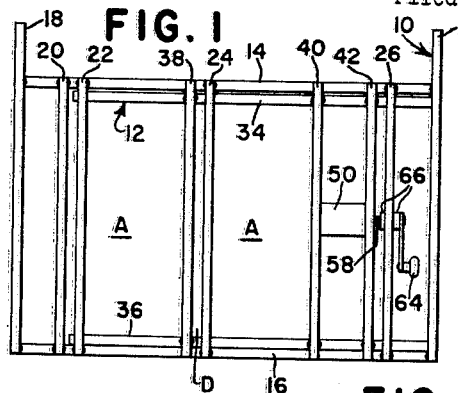
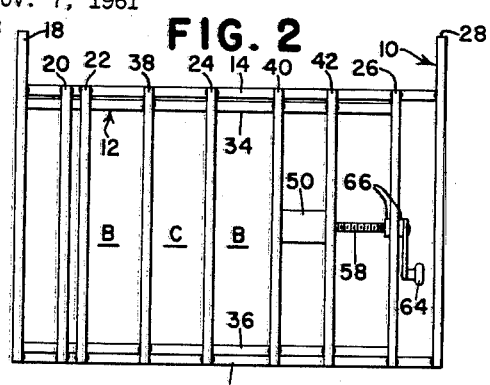
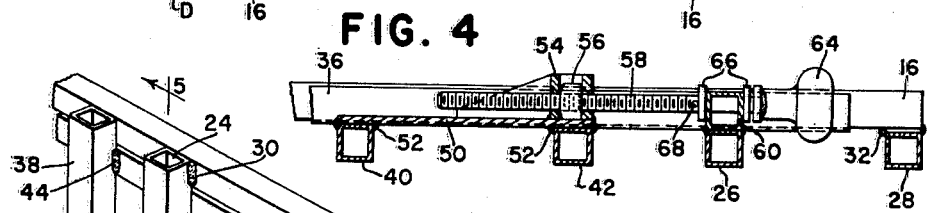
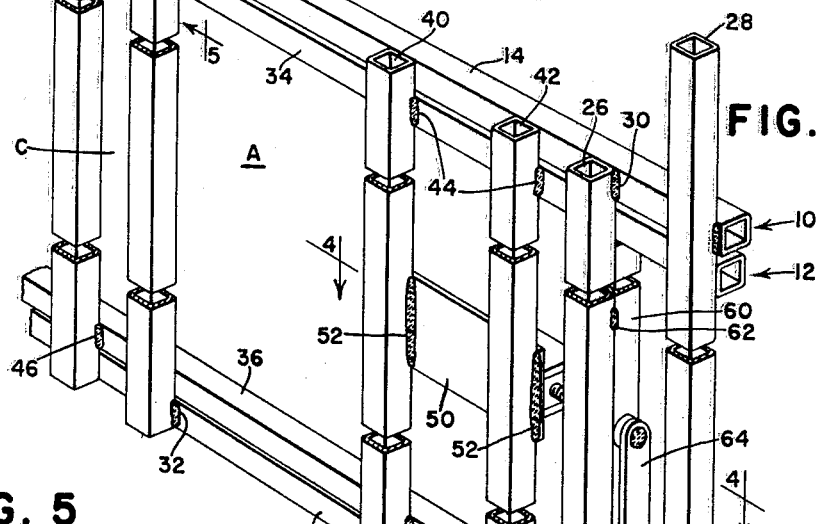
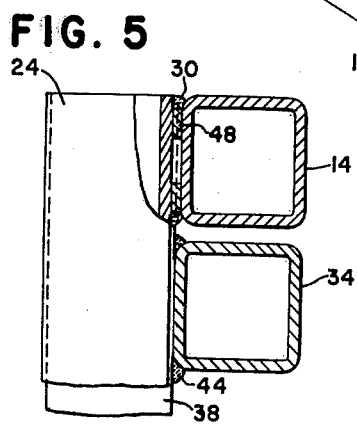
INVENTOR.
H. E. DUSTIN
BY
ATTORNEY United States Patent Office 3,072,100
Patented Jan. 8, 1963

3,072,100
ANIMAL SORTER
Harold E. Dustin, R.R. 2, Galva, Ill.
Filed Nov. 7, 1961, Ser. No. 150,815
7 Claims. (Cl. 119—155)

This invention relates to an animal sorter and more particularly to a device which finds special utility in the sorting, classifying or separating of hogs, for example, according to size and therefore according to weight.

It is desirable in the marketing of hogs to group all animals according to a certain general weight. For example, some operators will market hogs at or around 200 lbs. per animal, others at or around 190 lbs. etc. In any case, the problem is the same; that is, picking out animals in the selected weight class. According to the present invention, this problem has been solved by providing a means which is used in conjunction with the opening in a pen or the like which provides one or more openings adjusted to a size which will retain animals at or above a certain size, allowing the smaller animals to escape. By proper adjustment of the opening and general knowledge of the weight of an animal according to its size, proper weight grouping, within relatively narrow limits, may be accomplished. The means also has utility in connection with the separating of the mother from the young pigs at farrowing time. It is a principal object of the invention to provide such means in the form of a pair of relatively movable frame elements having cooperative bars which are selectively adjustable through a relatively wide range so as to be useful in establishing a correspondingly wide range of weight groups. It is a further object to construct the means in a simple and economical manner so that it may be readily produced, sold and used, the construction being of a comparatively simple yet sturdy nature which lends itself to long life with little or no service problems.

The foregoing and other important objects and desirable features inherent in and encompassed by the invention will become apparent as a preferred embodiment thereof is disclosed in detail in the ensuing description and accompanying sheet of drawings, the figures of which are described below.

FIGURE 1 is an elevation of the structure in which the openings are set at their greatest width.

FIGURE 2 is a similar view in which the openings are set at susbtantially their narrowest width.

FIGURE 3 is an enlarged fragmentary perspective, with portions omitted and others somewhat exaggerated, illustrating the general relationship of the two frames to each other.

FIGURE 4 is a section as seen generally along the line 4—4 of FIGURE 3.

FIGURE 5 is an enlarged section as seen generally along the line 5—5 of FIGURE 3.

The structure comprises essentially first and second generally similar frames 10 and 12, arranged in juxtaposed and overlapping relation, with one being slidable relative to the other so as to provide various combinations of opening sizes through which animals of certain sizes may escape while animals of larger sizes are restrained. This will be clear from a comparison of FIGURES 1 and 2, in which the two openings A will be seen to be wider than the two openings B in FIGURE 2, which is a result of relative adjustment between the two frames in a horizontal direction. A third opening occurs at C in FIGURE 2 and the fact that it appears to be the same size as the opening B is a coincidence, since the space C is merely an increase in the size of the space D in FIGURE 1. Were the openings B to become larger, as by movement of the frame 12 to the right relative to the frame 10, the opening C would then approach the size of the space D. The opening A also appears in FIGURE 3 as does the space C.

As will be seen, the structure is generally rectangular in shape and is adapted to be disposed in the opening of a pen or other enclosure, normally in substitution for the usual gate. Although the structure is shown as having two controllable openings, such as at A in FIGURE 1, the structure may be made of any length, having any desired number of adjustable openings. Changes of this character, such as those in the particular material and other charcteristics may be altered without departing from the spirit and principles of the invention.

The frame 10 comprises a first pair of top and bottom members 14 and 16, respectively, and a plurality or set of horizontally spaced uprights 18, 20, 22, 24, 26 and 28. The uprights 18 and 28 are longer than the others and are adapted to be connected to the end posts or other supports in the pen or other enclosure. As best shown in FIGURE 3, the top and bottom members 14 and 16 may be regarded as generally coplanar in a vertical plane, and it will be seen that the uprights 18 through 28 are coplanar in another vertical plane closely offset from the plane of the members 14 and 16. The uprights are secured at their opposite ends respectively to the members 14 and 16 as by welding at 30 and 32 respectively. The stock of which the uprights and members are constructed is preferably of square tubular section; although, this is not a limitation on the adaptability of the invention to construction of material of other types.

The second frame 12 comprises a second pair of top and bottom members 34 and 36, respectively, and a plurality of uprights 38, 40 and 42. These uprights are welded adjacent to their opopsite ends respectively to the top and bottom members 34 and 36 of the second frame 12, as indicated at 44 and 46.

In the assembly of the two frame structures, and by the use of appropriate jigs, the members 14 and 16 and the members 34 and 36 are arranged generally coplanar, with the member 34 lying immediately below and parallel to the member 14 and the member 36 lying immediately above and parallel to the member 16. As best seen in FIGURE 3, the uprights 38, 40 and 42 of the second frame 12 are sufficiently long so that at their upper and lower ends respectively they extend beyond the upper and lower members 34 and 36 so as to loosely overlap the members 14 and 16 of the other frame 10. In short, the uprights 38, 40 and 42 are welded at 44 and 46 to the members 34 and 36 but are not welded to the members 14 and 16, whereas the uprights 18 through 28 of the frame 10 are welded to the top and bottom members 14 and 16 at 30 and 32 but are not welded to the members 34 and 36. In order to provide proper clearance between the two frames, which are thus mounted for relative sliding, spacers may be interposed between the members 14 and 16 and the uprights 18 through 28. A representative spacer is suggested at 48 in FIGURE 5. Suitable vertical clearance is of course afforded between the members 14 and 34 and 36 and 16.

From the description thus far, it will be seen that the two frames are relatively slidably interconnected for movement of one with respect to the other lengthwise of the top and bottom members 14 and 34 and 16 and 36, but the inner relationship of the members and uprights is such that the two frames cannot come apart in a direction normal to the vertical planes in which the members and uprights are respectively coplanar. In other words, the members 34 and 36 are locked in behind the uprights of the frame 10 and the members 14 and 16 of the frame 10 are locked in oppositely behind the extended end portions of the uprights of the frame 12.

Looking now at FIGURE 1, it will be seen that the width of the opening A is determined by the distance between the upright 22 of the frame 10 and the next rightward upright 38 of the frame 12; the second opening, to the right of the opening just referred to, has its width determined by the distance between the upright 24 of the frame 10 and the next adjacent upright 40 of the frame 12. When the frame 12 is moved to the left relative to the frame 10, the opening decreases in size, as each corresponding upright of the frame 12 approaches its associated upright of the frame 10. Specifically, as the upright 38 approaches the upright 22, the distance A diminishes to that at B in FIGURE 2, and the space D increases to that at C as the upright 38 moves away from the upright 24. Likewise, the width of the other opening A diminishes to the width of the opening B as the upright 40 on the frame 12 approaches the upright 24 on the frame 10.

For purposes of illustration, the width of each opening A may be on the order of twelve inches and the width of each opening B may be on the order of five inches. These, which may be regarded as maximum and minimum widths may, of course, be varied, but those selected have proven highly useful in commercially acceptable embodiments of the invention. It will be clear, of course, that an infinite variety of widths between A and B may be established, depending upon the amount of relative adjustment of the two frames.

For the purpose of facilitating adjustment and at the same time securing the selected position of adjustment, means is provided for effecting movement of the frame 12 relative to the frame 10. In the preesnt case, this comprises a pair of cooperative parts, one acting on one frame and the other reacting on the other. For this purpose the two uprights 40 and 42 adjacent to the right hand end of the frame 12 may be interconnected at their intermediate portions by a plate 50, welding being used as at 52 as a means for the affixation. This plate may have rigidly secured thereto a bracket 54 which mounts a captive nut 56, representing an internally threaded element. A screw threaded rotatable member 58 is threaded through the nut 56 and is rotatably carried by a support part or element, here in the form of an additional upright 60, rigidly affixed to one side of the upright 26, as by welding at 62. This support part is apertured to receive the right hand portion of the screw threaded member 58, the terminal end of which is provided with a crank 64, movable in the fixed space between the elements 26 and 28, which assures that the crank will not project beyond the upright 28 and thus interfere with the connection of that upright to a supporting part of the pen or other enclosure. The screw or threaded member 58 is confined against axial shifting relative to the support part 60 as by a pair of washers 66, one at each side of the part 60. One of the washers may lie just inside the handle of the crank 64 and the other may be retained against axial displacement as by a pin 68.

It will be seen that rotation of the crank 64 will cause movement of the frame 12 relative to the frame 10 in one direction or the other, depending upon the direction of rotation of the screw. Since the threaded relationship between the screw 58 and the nut 56 is substantially non-reversible, the selected position of adjustment will be maintained until altered. It will be obvious, of course, that suitable indicia, not shown here, could be provided for indicating, in inches or otherwise, the adjusted widths of the openings A and B. Various other changes, modifications, substitutions etc. could of course be made, all falling within the scope of the invention.

What is claimed is:

1. An animal sorter, comprising: first and second generally similar frames, each having elongated horizontal top and bottom members and a plurality of horizontally spaced apart uprights rigidly secured at opposite ends respectively to said members to provide a plurality of openings lengthwise of the respective frame; means mounting the frames in juxtaposed overlapping relation with the top and bottom member and uprights of one respectively parallel and proximate to those of the other and with the openings of one frame variably registrable with the openings of the other frame, said means including cooperative parts respectively on the frames and interconnecting said frames for relative adjustment thereof lengthwise of the top and bottom members for selectively varying the horizontal spacing between the uprights of one frame and the uprights of the other and thus varying the register of the openings of one frame with those of the other.

2. The invention defined in claim 1, including: mechanism connected between the frames and acting on one and reacting on the other for effecting said relative adjustment of the frames.

3. The invention defined in claim 2, in which: said mechanism includes a pair of cooperative screw threaded elements, one fixed to one frame and the other rotatably carried by the other frame.

4. An animal sorter, comprising: first and second generally similar frames, each having horizontal top and bottom members and a plurality of horizontally spaced apart uprights, said frames being arranged for relative adjustment lengthwise of the top and bottom members for selectively varying the spacing between the uprights of one frame and those of the other, characterized in that the members are generally coplanar, with the top and bottom members of the first frame lying parallel to and respectively immediately above and below those of the second frame, the uprights of both frames are generally coplanar in a vertical plane closely offset from the plane of the members, the uprights of the first frame closely overlying the members of the second frame and rigidly secured to the members of the first frame and the uprights of the second frame being rigidly secured adjacent to opposite end portions respectively to the members of the second frame, said second frame uprights being upwardly and downwardly extended at their end portions respectively beyond the second frame members to respectively loosely overlie the top and bottom members of the first frame whereby the frames are interconnected for relative sliding lengthwise of said members within the limits of the spacing of the uprights but are restrained against separation normal to said vertical planes of the members and uprights.

5. The invention defined in claim 4, including: mechanism connected between the frames and acting on one and reacting on the other for effecting said relative adjustment of the frames.

6. The invention defined in claim 5, in which: said mechanism includes a pair of cooperative screw threaded elements, one fixed to one frame and the other rotatably carried by the other frame.

7. The invention defined in claim 4, in which: the first frame includes at each end thereof an upright extension beyond its top member for attachment to a support or the like.

References Cited in the file of this patent

UNITED STATES PATENTS 1,028,588    Mitchell _____ June 4, 1912

FOREIGN PATENTS 120,400    Sweden _____ Dec. 9, 1947